United States Patent [19]
Fukada et al.

[11] Patent Number: 5,674,304
[45] Date of Patent: *Oct. 7, 1997

[54] METHOD OF HEAT-TREATING A GLASS SUBSTRATE

[75] Inventors: Takeshi Fukada; Mitsunori Sakama; Satoshi Teramoto, all of Kanagawa, Japan

[73] Assignee: Semiconductor Energy Laboratory Co., Ltd., Kanagawa, Japan

[*] Notice: The term of this patent shall not extend beyond the expiration date of Pat. No. 5,492,843.

[21] Appl. No.: 311,275

[22] Filed: Sep. 23, 1994

[30] Foreign Application Priority Data

Oct. 12, 1993 [JP] Japan .................. 5-279029

[51] Int. Cl.$^6$ .............. C03D 25/00; C03C 17/00
[52] U.S. Cl. ............ 65/32.4; 65/60.1; 65/60.2; 65/60.5; 65/60.8; 65/111; 65/117; 427/108; 427/126.2; 427/374.1; 427/374.3; 427/379; 427/380; 437/248
[58] Field of Search ................ 65/32.4, 60.1, 65/60.4, 60.5, 111, 114, 117, 104, 60.2, 60.8; 427/585, 588, 584, 109, 126.2, 126.4, 165, 166, 374.1, 372.2, 379, 380, 383.5, 583, 108, 126.3, 167, 255, 374.3, 374.2; 437/243, 235, 248, 241, 238, 245

[56] References Cited

U.S. PATENT DOCUMENTS

| | | | |
|---|---|---|---|
| 4,100,330 | 7/1978 | Donley | 65/60.6 |
| 4,116,658 | 9/1978 | Sano | 65/60.2 |
| 4,399,015 | 8/1983 | Endo et al. | 204/192 P |
| 4,824,712 | 4/1989 | Falleroni et al. | 428/137 |
| 4,959,136 | 9/1990 | Hatwar | 204/192.15 |
| 5,094,966 | 3/1992 | Yamazaki | 437/40 |
| 5,163,220 | 11/1992 | Zeto et al. | 29/846 |
| 5,165,972 | 11/1992 | Porter | 65/60.8 |
| 5,252,140 | 10/1993 | Kobayashi et al. | |
| 5,254,208 | 10/1993 | Zhang | |
| 5,262,654 | 11/1993 | Yamazaki | |
| 5,296,653 | 3/1994 | Kiyota et al. | 174/250 |
| 5,372,860 | 12/1994 | Fehlner et al. | 427/578 |
| 5,492,843 | 2/1996 | Adachi et al. | 437/174 |

FOREIGN PATENT DOCUMENTS

| | | |
|---|---|---|
| 58-114037 | 7/1983 | Japan . |
| 64-32443 | 2/1989 | Japan . |
| 1-319682 | 12/1989 | Japan . |
| 2-102150 | 4/1990 | Japan . |

*Primary Examiner*—Steven P. Griffin
*Attorney, Agent, or Firm*—Sixbey, Friedman, Leedom & Ferguson, PC; Gerald J. Ferguson, Jr.; Jeffrey L. Costellia

[57] ABSTRACT

A method of heat-treating a glass substrate where the substrate is thermally treated (such as the formation of films, growth of films, and oxidation) around or above its strain point. After thermally treating the substrate around or above its strain point the glass substrate may be slowly cooled at a rate of 0.01° to 0.5° C./min to achieve maximum shrinkage of the substrate. Following further thermal treatments the substrate may be quickly cooled at a rate of 10° C./min to 300° C./sec to suppress shrinkage of the glass substrate. The substrate can have films such as aluminum nitrate films, silicon oxide films, silicon films, insulating films, semiconductor films, etc. Film formation can occur either before or after thermal treatment of the substrate around or above its strain point and before further thermal treatments.

25 Claims, 6 Drawing Sheets

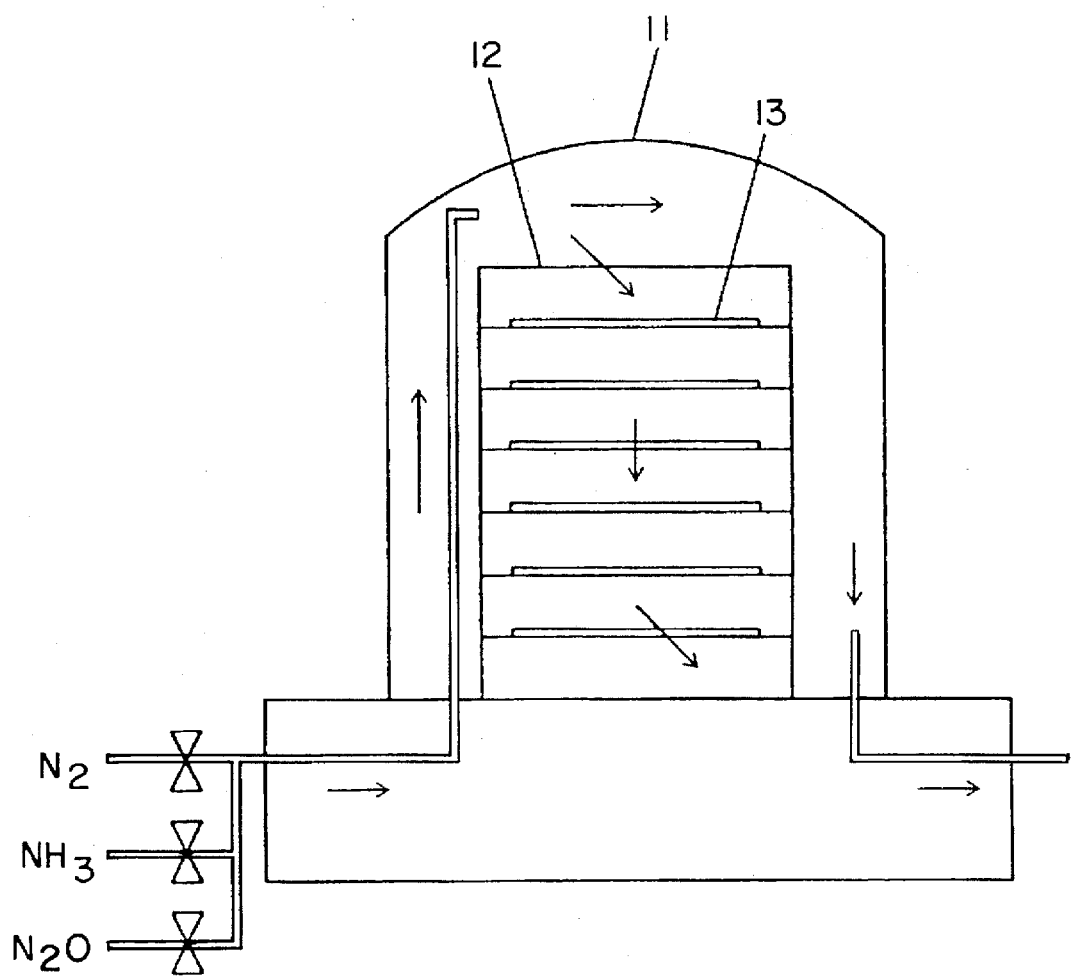

VISIBLE OR NEAR INFRARED LIGHT

METHOD OF HEAT-TREATING A GLASS SUBSTRATE

FIELD OF THE INVENTION

The present invention relates to a glass substrate on which a semiconductor device is formed and, more particularly, to a bottom layer formed on the surface of a glass substrate and a method of fabricating the bottom layer. Furthermore, the invention relates to a method of heat-treating a glass substrate.

BACKGROUND OF THE INVENTION

A thin-film transistor (TFT) is known as a thin-film semiconductor device fabricated on a glass substrate. TFTs formed on such a glass substrate are disposed in a pixel driver portion and also in a peripheral circuit for a liquid crystal display and are used to display images with high information content. Furthermore, these TFTs are employed in image sensors and in other integrated circuits.

Where a glass substrate is used, the following advantages can be derived:

(1) Since it is optically transparent to visible light, the glass substrate can be easily utilized in a device such as a liquid crystal display through which light is transmitted.

(2) It is inexpensive. However, the upper limit of the thermal treatment temperature is restricted by the heatproofness, i.e., the maximum usable temperature, of the glass substrate.

Corning 7059 glass is generally used as a glass substrate taking account of the problem of impurity release from the glass substrate, price problem, and other problems. The transition point of this glass is 628° C. and the strain point is 593° C. Other known practical industrial glass materials having strain points of 550°–650° C. are listed in Table 1 below.

TABLE 1

|  | 7059D (CGW) | 7059F (CGW) | 1733 (CGW) |
|---|---|---|---|
| strain point (°C.) | 593 | 593 | 640 |
| thermal expansion coefficient ($\times 10^{-7}$) | 50.1 | 50.1 | 36.5 |
| transmission (%) | 89.5 (400 nm) | 89.5 (400 nm) | 91.9 (400 nm) |
| composition |  |  |  |
| $SiO_2$ | 49 | 49 | 57 |
| $Al_2O_3$ | 10 | 10 | 16 |
| $B_2O_3$ | 15 | 15 | 11 |
| $R_2O$ |  |  | 0.1 |

|  | LE30 (HOYA) | TRC5 (OHARA) | E-8 (OHARA) |
|---|---|---|---|
| strain point (°C.) | 625 |  | 643 |
| thermal expansion coefficient ($\times 10^{-7}$) | 38.0 | 52.0 | 37.0 |
| transmission (%) | 90.0 (450 nm) | N.A. | 91.0 (450 nm) |
| composition |  |  |  |
| $SiO_2$ | 60 |  | 59 |
| $Al_2O_3$ | 15 |  | 15 |
| $B_2O_3$ | 6 |  | 7 |
| $R_2O$ | 2 |  | 1 |

|  | N-0 (NEG) | OA2 (NEG) | AN1 (AGC) |
|---|---|---|---|
| strain point (°C.) |  | 625 | 625 |
| thermal expansion coefficient ($\times 10^{-7}$) | -7.0 | 38.0 | 44.0 |
| transmission (%) | N.A. | 90.0 (450 nm) | 90.0 (500 nm) |
| composition |  |  |  |
| $SiO_2$ |  | 60 | 56 |
| $Al_2O_3$ |  | 15 | 15 |
| $B_2O_3$ |  | 6 | 2 |
| $R_2O$ |  | 2 | 0.1 |

|  | AN2 (AGC) | NA35 (HOYA) | NA45 (HOYA) |
|---|---|---|---|
| strain point (°C.) | 616 | 650 | 610 |
| thermal expansion coefficient ($\times 10^{-7}$) | 47.0 | 39.0 | 48.0 |
| transmission (%) | 89.8 (500 nm) | N.A. | N.A. |
| composition |  |  |  |
| $SiO_2$ | 53 |  | 51 |
| $Al_2O_3$ | 11 |  | 11 |
| $B_2O_3$ | 12 |  | 13 |
| $R_2O$ | 0.1 |  | 0.1 |

Where an amorphous silicon film formed on a glass substrate by CVD is crystallized by heating, a high temperature, e.g., above 600° C., is generally needed. Therefore, where a Corning 7059 glass substrate is used, the substrate is shrunk by the heating.

An active-matrix liquid crystal display is known as a device utilizing TFTs formed on a glass substrate. To fabricate this liquid crystal display, it is necessary to form tens of thousands to several millions of TFTs on the glass substrate in rows and columns. To manufacture the TFTs, processes using numerous masks are necessitated. Consequently, shrinkage of the substrate is a great impediment to the manufacturing process.

Especially, where it is necessary to make a mask alignment before thermal treatment, substrate shrinkage caused by the thermal treatment is a problem.

In a process for heat-treating substrates, it is common practice to place these plural substrates in vertical posture within a heating furnace, taking account of the processing speed. Where the substrates are heated above their strain point, warpage of the substrates is conspicuous.

Where TFTs are formed on a glass substrate, if the used TFTs permit flow of a large electrical current, then generation of heat accompanying the operation is a problem. This problem associated with the heat generation arises from the difference in coefficient of thermal expansion between silicon and the glass substrate. That is, the coefficient of thermal expansion of silicon, i.e., a single crystal of silicon, is 148 W $m^{-1}K^{-1}$ (300° K.), while the coefficient of thermal expansion of the glass substrate, i.e., quartz glass, is 1.38 W $m^{-1}K^{-1}$ (300° K.). Since the coefficient of thermal expansion of the glass substrate is much lower than that of silicon in this way, during operation of TFTs, heat generated by the TFTs cannot escape. Hence, malfunction and thermal destruction due to the heat generation present problems.

Especially, these problems become conspicuous where crystalline silicon is used. In particular, TFTs using an amorphous silicon film treat weak electrical current and so the problem of heat generation is not so serious. On the other hand, TFTs using a crystalline silicon film permit flow of large electrical current. Therefore, generation of heat poses a great problem.

SUMMARY OF THE INVENTION

It is an object of the present invention to provide a method of carrying out a heating step for fabrication of a semiconductor device using a glass substrate without suffering from problems of shrinkage and flexure of the glass substrate and without suffering from the problem of heat generation during operation of TFTs. A film comprising aluminum nitride is formed on one or both surfaces of a glass substrate having a strain point of 550°–690° C. to provide a glass substrate assembly.

The present invention is based on a fact we have discovered empirically. Specifically, a glass substrate was heat-treated above its strain point. Then, the substrate was slowly cooled at a rate of 0.01°–0.5° C./min. A later heating step was carried out at a temperature lower than the strain point of the glass substrate. During this step, the substrate was rapidly cooled at a rate of 10° C./min to 300° C./sec. Shrinkage of the glass substrate could be suppressed within 50 ppm.

By performing the above-described processing, glass substrates which generally have strain points of 550°–690° C. and which result in shrinkage of less than 50 ppm in a heat-treating step conducted below 600° C. can be obtained.

In one feature of the invention, glass substrates are heat-treated while held substantially horizontal to solve the problem of warpage of the glass substrates when they are thermally treated. One example of an apparatus for holding the substrates substantially horizontal and thermally processing them is shown in FIG. 1.

FIG. 1 schematically shows a heating furnace comprising a reaction tube 11 made of quartz, substrate-holding means 12, or substrate holders, and substrates 13 held horizontal. The apparatus is further equipped with a heater (not shown) for heating the reaction tube 11 from outside. In addition, the furnace is equipped with a means for supplying desired gases into the reaction tube and also with means for moving the substrate-holding means out of the reaction tube.

FIG. 1 shows the condition in which the glass substrates 13 are held horizontal on the substrate-holding portions 12 to prevent the substrates from being warped and deteriorated in planarity if they are heat-treated. This scheme is advantageous where glass substrates are required to be heated above their strain point.

Where it is not desired to permit glass substrates to shrink in a heating step, it is possible to previously heat-treat the glass substrates. As a result, in a later heating step, shrinkage of the substrates is suppressed.

We conducted experiments and have found the following facts. If such a preheating step is carried out above the strain point of the glass substrates, and if they are slowly cooled after the thermal treatment, then they shrink to a large extent. If the subsequent heating step is carried out below the transition point of the glass substrates, and if they are quickly cooled after this thermal processing, then they hardly shrink. For example, a glass substrate assembly is prepared which comprises:

a glass substrate which shows a shrinkage of less than 50 ppm when rapidly cooled after a heat treatment conducted at a temperature lower than 600° C.; and a film provided on one or both surfaces of said glass substrate and comprising aluminum nitride. Then, this glass substrate assembly is subjected to the heat treatment conducted at a temperature lower than 600° C. This glass substrate assembly hardly shrink even by this heat treatment.

In the preheating step, it is important that each glass substrate be slowly cooled at a rate of 0.01° to 0.5° C./min, e.g., less than 0.2° C./min. A glass substrate shrinks when heated. If it is slowly cooled after completion of heating, the substrate shrinks to a very large extent. At the same time, local stress inside the glass substrate is lessened. As a result, as the extent of shrinkage increases, shrinkage of the substrate caused by a later heating step is reduced. Furthermore, as the temperature of this heating processing is elevated, the effect of this method becomes more conspicuous.

In heat treatments necessary for formation of films, crystal growth, and oxidation which are carried out after the preheating processing, it is important that the substrate be quickly cooled at a rate of 10° C./min to 300° C./sec after the heating. Especially, around the strain point of the glass material, i.e., ±100° C. from the strain point, preferably ±50° C. from the strain point, if the substrate is quickly cooled at the above-described rate, then the elongation and shrinkage of the glass material can be suppressed. For example, for Corning 7059 glass, in a case of a process where a processing temperature of 493°–693° C. is required, further shrinkage (or in some cases, elongation) can be effectively suppressed below 50 ppm by quickly cooling the substrate at least down to 493° C.

Examples of heat treatment conducted after preheating processing include crystallization of an amorphous semiconductor formed on the glass substrate, using heating, thermal annealing of semiconductor films and semiconductor devices formed on the glass substrate, and heat treatment needed when semiconductor films and insulating films are formed on the glass substrate. In these heat treatment steps, heat is applied to the glass substrate.

The above-described preheating processing for causing the glass substrate to shrink in advance is required to be effected at a temperature higher than the heating temperature of a heating step carried out later. More specifically, glass substrates having strain points of 550°–690° C. are required to be heart-treated at temperatures higher than 600° C. and also higher than the strain points of the glass substrates.

An aluminum nitride (AlN) film is previously formed as a bottom film on a glass substrate to solve the problem of generation of heat from an element (e.g. TFT) through which current flows where the element (e.g. TFT) is formed on the glass substrate.

The coefficient of thermal expansion of aluminum nitride is about 200 W m$^{-1}$K$^{-1}$ or more and is greater than that of crystalline silicon forming TFTs. It is considered that the coefficient of thermal expansion of crystalline silicon is smaller than 150 W m$^{-1}$K$^{-1}$ of a single crystal of silicon. Hence, aluminum nitride acts as a heat dissipator, or a heat sink. In addition, an aluminum nitride film transmits visible light. Therefore, an aluminum nitride film can be used in a liquid crystal display without difficulty.

Sputtering, plasma-assisted CVD, and other methods are known as methods of forming this aluminum nitride (AlN). Especially, use of a positive column type plasma-assisted CVD system capable of depositing films on both surfaces of a glass substrate simultaneously is useful. Thermal CVD may be used to form the aluminum nitride. As the thickness is increased, the performance of the heat sink for TFTs is improved. In practice, however, the thickness should be set to 500 Å to 3 μm, preferably 1000 Å, to 1 μm.

This positive column type plasma-assisted CVD system is schematically shown in FIGS. 5 and 6. FIG. 6 is a cross section taken on line A—A' of FIG. 5. In FIGS. 5 and 6, indicated by 58 is a vacuum chamber. RF power supplies 50 and 51 of 13.56 MHz apply RF power across a pair of electrodes 54 and 55 to produce an RF discharge between the electrodes. Substrates 53 on which films should be formed are held in a substrate support 56 having a frame structure. Ends of the substrates 53 are held inside the substrate support 56 by a substrate support member 57 such that films are deposited on both surfaces of each substrate. An introduction system 52 introduces reactive gases and a carrier gas. Unwanted gases are discharged from a discharge system 59 by a vacuum pump 60.

One advantage of the use of the system shown in FIGS. 5 and 6 is that plural substrates can be processed at the same time. Another advantage is that films can be deposited on both surfaces of each substrate. Especially, where aluminum nitride is deposited as a bottom film on the surface of a glass substrate, if the aluminum nitride film is formed on both surfaces of the substrate, then the following advantages are obtained:

(1) The aluminum nitride films formed on both surfaces of the glass substrate can suppress the effects of substances released from the glass substrate.

(2) In a later heat treatment step, the substrate can be prevented from warping to one side.

Where the above-described advantages should be derived by ordinary sputtering techniques or by the use of parallel-plate plasma CVD equipment, a film must be formed on each side separately. When the substrate is turned upside down, contamination will take place. Also, the number of manufacturing steps is increased. As a result, the productivity deteriorates.

Sometimes, an aluminum nitride film formed by sputtering techniques or a CVD process contains only a small percentage of aluminum component and an excessive amount of nitrogenous component. In this case, the grown aluminum nitride film is colored yellow. Also, the resistivity of this film is not sufficient where this film is regarded as an insulator.

To improve this situation, the film is heat-treated in an ambient of nitrogen or a mixture of nitrogen and oxygen (e.g., air). Where the film is heat-treated in a nitrogen ambient, an aluminum nitride film having required transmissivity and resistivity, of course, can be obtained. Where the film is heat-treated in an ambient consisting of a mixture of nitrogen and oxygen, it is possible to obtain a film of aluminum nitride given by $AlN_xO_y$. In this case, the film can contain 0.001 to 10 atomic percent of oxygen (O). Good transmissivity and insulating characteristics can be derived. Furthermore, the film can serve as a heat sink, or a cool sink, for TFTs. If local heat-generating regions such as TFTs exist on the substrate, the cool sink distributes the generated heat over the whole substrate and makes the temperature uniform. The aluminum nitride film may also contain 0.01 to 20 atomic % of oxygen.

A step in which this aluminum nitride film is heat-treated and, at the same time, the glass substrate is previously shrunk is quite advantageous to the manufacturing process. In particular, preheating of the aluminum nitride film and preheating of the glass substrate are effected at the same time. As a result, an aluminum nitride film best suited for high-mobility TFTs is formed as a bottom film. In addition, shrinkage of the glass substrate can be suppressed to a minimum even in a step where heating is needed.

Of course, an aluminum nitride film may be formed after preheating the glass substrate, and then the aluminum nitride film may be heat-treated. In this case, it is important that the preheating be carried out above the strain point of the glass substrate and that the heating of the aluminum nitride film be effected below the temperature of the preheating. At this time, the glass substrate is slowly cooled to shrink it after the preheating. After the heating of the aluminum nitride film, the substrate is quickly cooled. Thus, shrinkage of the substrate caused during heat-treating step of this aluminum nitride film can be suppressed to a minimum.

Our research has revealed that an amorphous silicon film can be crystallized even at a temperature lower than 600° C. by introducing an impurity such as Ni, Pb, or Si for promoting the crystallization into the amorphous silicon film, and that crystals can be grown either parallel to the substrate or selectively by selectively introducing an impurity such as Ni, Pb, or Si that promotes the crystallization.

Where this manufacturing step is adopted, it is necessary to make a mask alignment before crystallization so as to selectively introduce an impurity before the crystallization utilizing heating is effected. Therefore, in this case, suppressing shrinkage of the glass substrate in a heating step below 50 ppm is quite useful for the present invention, the heating step being carried out after a mask alignment step. Depending on the kind of the glass, elongation and shrinkage exhibit anisotropy.

When an oxide film is formed on the surface of a semiconductor by means of heating in an oxidizing ambient (this is generally known as thermal oxidation), the invention can be used to advantage. Also, where a desired film is formed by means of heating in an ambient containing the raw materials of the film, the invention can be used to advantage.

It is important that any of these heating steps be carried out at a temperature lower than the temperature of preheating processing initially carried out above the strain point of the glass substrate. In addition, it is important that where preheating processing is performed, slow cooling be done after the preheating processing, and that in later heating processing, quick cooling be effected.

Further, a method of heat-treating a glass substrate having a strain point in accordance with another aspect of the present invention comprises the steps of:

forming a film comprising aluminum nitride on a surface of said glass substrate; and heat-treating said glass substrate at a temperature lying within ±50° C. from the strain point of said glass substrate so that aluminum remaining in said aluminum nitride may be nitrided or oxidized. After said step of heat-treating the glass substrate, a second heat treatment may be carried out at a temperature lower than the temperature of said step of heat-treating said glass substrate, followed by rapidly cooling the substrate at a rate of 10° C./min to 300° C./sec around the strain point of the glass substrate.

Other objects and features of the invention will appear in the course of the description thereof, which follows.

BRIEF DESCRIPTION OF THE DRAWINGS

FIG. 1 is a vertical cross section of a heating furnace;

DETAILED DESCRIPTION OF THE INVENTION

Example 1

The present example is an example of a complementary combination of a P-channel TFT (PTFT) and an N-channel TFT (NTFT). These TFTs use a crystalline silicon film formed on a glass substrate shown in FIGS. 2(A)–2(D). The configuration of the present example can be used for switching devices for pixel electrodes for an active-matrix liquid crystal display, a peripheral driver circuit, an image sensor, and a three-dimensional IC. Especially, where a peripheral circuit for an active-matrix liquid crystal display is formed on the same substrate, the configuration of the present example can be advantageously used for TFTs of the peripheral driver circuit, for the following reason. The TFTs of the peripheral driver circuit are driven with a large current. Consequently, it is necessary that high reliability be secured in spite of heat generated.

In the present example, NA35 (see Table 1) is used as a substrate. This NA35 substrate has a strain point of 650° C. and is more heatresistant than Corning 7059 glass (having a strain point of 593° C.). Hence, this NA35 glass is useful where a high-temperature processing step is needed.

Figure 5:
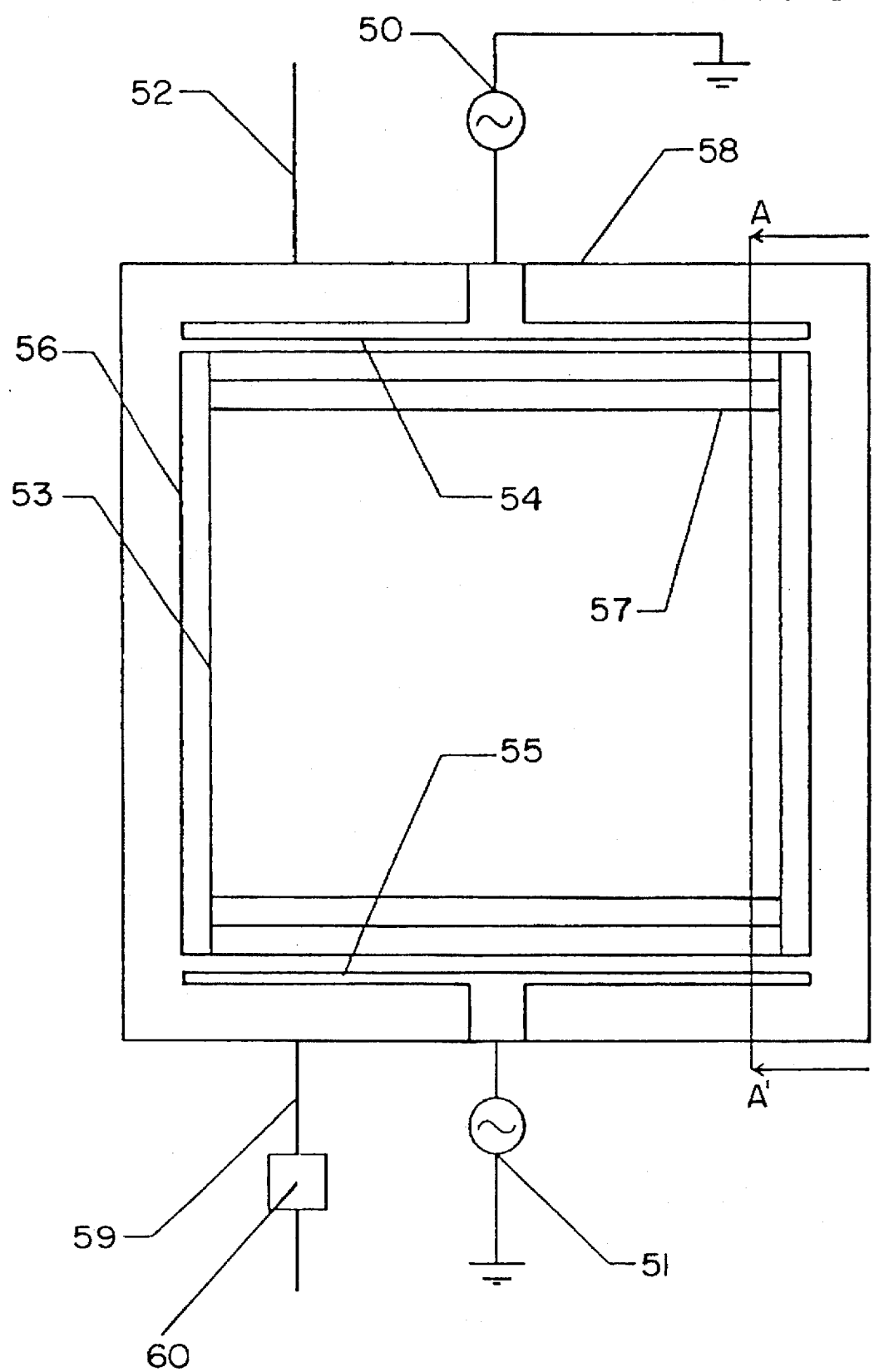
FIG. 5 is a schematic view of a CVD system used in the illustrated examples of the invention.

First, an aluminum nitride film 202 ($AlN_xO_y$; y contains 0) was formed on the glass substrate 201 to a thickness of 4000 Å by a positive column type plasma-assisted CVD system shown in FIG. 5. The thickness is 0.1 to 2 μm, typically 0.2 to 0.5 μm. In the present example, the thickness was 0.3 μm. For the formation of the aluminum nitride film 202, $Al(C_4H_9)_3$ and $N_2$ gases were used as raw material gases. In this step, the aluminum nitride film 202 was formed on both surfaces of the glass substrate 201 at the same time.

Then, the glass substrate 201 was previously heat-treated to perform preheating processing for previously shrinking the glass substrate 201 and simultaneously to carry out an annealing step for annealing the previously formed aluminum nitride film. This step was effected for 4 hours at 690° C. which was higher than the strain point (650° C.) of the NA35 glass substrate 201. The ambient consisted of 100% nitrogen ($N_2$). The ambient may consist of ammonia ($NH_3$), dinitrogen monoxide ($N_2O$), nitrogen ($N_2$) or a mixture thereof. The pressure was ordinary pressure.

This step was carried out, using the heating furnace shown in FIG. 1 while holding plural substrates 13 horizontal. The heating step was performed in a nitrogen ambient at ordinary pressure. Preferably, this heat treatment is made within ±30 degrees from the horizontal in order to prevent the substrates from warping.

Where aluminum nitride is deposited on both surfaces of the glass substrate as described above, the possibility that the substrates are warped by heat treatment is reduced and so this heat treatment can be made while placing the substrates upright.

After the end of the heat treatment, each glass substrate was cooled at a rate of 0.01° to 0.5° C./min, e.g., 0.2° C./min. The cooling rate was controlled by using a nitrogenous gas such as nitrogen gas ($N_2$), ammonia ($NH_3$), or dinitrogen monoxide ($N_2O$) and varying the flow rate of the introduced gas. The nitrogen gas may contain 1 to 25 atomic % of oxygen. As a result of this slow cooling step, the glass substrate was shrunk by more than 1000 ppm. During cooling subsequent to the preheating processing, if nitrogen, ammonia, or dinitrogen monoxide is used, then vicinities of the surface of the glass substrate can be further nitrided by the gas. Thus, when the aluminum nitride films are annealed, impurities in the glass such as boron, barium, and sodium are prevented from being deposited in a semiconductor formed in later steps. This is effective in fabricating reliable semiconductor devices.

Before or after the above-described step, silicon oxide may be deposited as a bottom film on the aluminum nitride film 202. In this case, however, the performance of the heat sink formed by the aluminum nitride films deteriorates.

Also, after preheating processing for shrinking the substrate is performed, aluminum nitride films may be formed and then thermally annealed, e.g. by heat-treating the substrate in an ambient containing nitrogen.

Thereafter, an intrinsic (I-type) amorphous silicon film 203 having a thickness of 300 to 1500 Å, e.g., 800 Å, was formed by plasma CVD. A silicon oxide film 204 having a thickness of 100 to 800 Å, e.g., 200 Å, was deposited on the amorphous silicon film 203 by plasma CVD. This film 204 would act as a protective film in a thermal annealing step conducted later and prevent the film surface from roughening (FIG. 2(A)).

The laminate was thermally annealed at 600° C. for 8 hours in a nitrogen ambient at atmospheric pressure to crystallize the amorphous silicon film 203. In this way, a crystalline silicon film was obtained. Then, the laminate was quickly cooled at a rate of 10° to 300° C./min, e.g., more than 50° C./min, from the strain point by 100° C. (in this case, down to 493° C.). At this time, shrinkage of 0 to 44 ppm (on average, less than 20 ppm) of the glass substrate was observed. The heating furnace shown in FIG. 1 was used also for this step.

Meanwhile, some glass substrates did not undergo the preheating processing conducted at 640° C. A bottom film and an amorphous silicon film were formed on each substrate. The laminate was thermally annealed at 600° C. for 8 hours as described above. In this case, shrinkage of more than 1000 ppm was observed.

Prior to the crystallization of the amorphous silicon film utilizing heating, Ni or Pb is introduced as a crystallization-promoting material into the top or bottom surface of the amorphous silicon film, or the material is injected into the amorphous silicon film by ion implantation. In this way, crystals can be grown parallel to the substrate from the region in which the material has been introduced. Also, where silicon ions are selectively implanted, selective crystal growth can be done.

In this case, a mask must be formed and steps for creating films or an ion implantation step must be carried out before the heating step which is needed for crystallization. During the heating step, shrinkage of the substrate must be suppressed to a minimum. Therefore, in this case, the present invention capable of suppressing shrinkage of the glass substrate can be used to advantage.

Data about shrinkage of glass substrates each consisting of Corning 7059 glass in the present example is listed in Table 2. The substrates were subjected to preheating processing under the same conditions. Then, a bottom film was formed on each substrate. Subsequently, an amorphous silicon film was formed. The laminates were heated and crystallized under different conditions. Table 2 shows data about the final shrinkage of each substrate.

TABLE 2

Shrinkage of glass substrates under various conditions

| preheating processing of substrate (640° C., 4 hours) | thermal anneal (600° C., 4 hours) | shrinkage of substrate (ppm) |
| --- | --- | --- |
| slow cooling (0.2° C./min) | rapid cooling (50° C./min) | from 0 (not detectable) to 44 |
| slow cooling (0.2° C./min) | normal cooling (1–2° C./min) | 60–90 |

TABLE 2-continued

Shrinkage of glass substrates under various conditions

| preheating processing of substrate (640° C., 4 hours) | thermal anneal (600° C., 4 hours) | shrinkage of substrate (ppm) |
|---|---|---|
| slow cooling (0.2° C./min) | slow cooling (0.2° C./min) | 300 |

As can be seen from Table 2, where a glass substrate is heated to a temperature lower than the transition point (in this case, 628° C.) of the glass substrate, i.e., where the heating processing temperature is within at least ±100° C. from the strain point of the glass, as the cooling rate is increased, the resulting shrinkage of the substrate is reduced.

After the crystallization of the amorphous silicon film 203, making use of heating, the protective film 204 was removed. The silicon film 203 was photolithographically patterned to form an active layer 205 of TFTs in the form of islands. The dimension of the active layer 205 is determined, taking account of the channel length and the channel width of TFTs. Smaller active layers measured 50 μm by 20 μm. Larger active layers measured 100 μm by 1000 μm.

Then, the laminate was irradiated with infrared light having a peak between 0.6 to 4 μm (between 0.8 and 1.4 μm in this example) for 30 to 180 seconds to anneal the active layer 205, for further enhancing the crystallinity of the active layer 205.

At this time, the irradiation of the infrared light heated the active layer 205 to between 800° and 1300° C., typically between 900° and 1200° C., e.g., 1100° C. This temperature was not the actual temperature on the glass (because the glass transmits infrared light) but the temperature on a silicon wafer used as a monitor. The infrared light irradiation was effected in a $H_2$ ambient to improve the state of the surface of the active layer. In the present example, the active layer was selectively heated and, therefore, elevation of temperature of the glass substrate can be suppressed to a minimum. This was quite effective in reducing the defects and dangling bonds in the active layer (FIG. 2(B)).

A halogen lamp was used as an infrared light source. The intensity of the visible light or near-infrared light was so adjusted that the temperature on the single-crystal silicon monitor wafer was between 800° and 1300° C., typically between 900° and 1200° C. More specifically, the temperature of a thermocouple buried in the silicon wafer was monitored. The resulting signal was fed back to the infrared light source. We estimate that the temperature on the surface of the silicon on the glass substrate has decreased to about ⅔ of the original temperature. In the present example, the temperature was elevated at a constant rate of 50° to 200° C./sec. The temperature was rapidly lowered by natural cooling at a rate of 20° to 100° C./sec.

During irradiation of the infrared light, a silicon oxide film or a silicon nitride film is preferably formed as a protective film on the surface. This improves the state of the surface of the silicon film 205. In the present example, in order to improve the state of the surface of the silicon film 205, the infrared light irradiation was effected in a $H_2$ ambient, which may contain 0.1 to 10 volumetric % of HCl, other halogenated hydrogen, a fluorine compound, a chlorine compound, or a bromine compound.

This irradiation of visible light or near-infrared light selectively heats the crystallized silicon film and so the temperature elevation of the glass substrate can be suppressed to a minimum. This is quite effective in reducing the defects and dangling bonds in the silicon layer. After the end of this step, defects can be effectively reduced by carrying out a hydrogen anneal at 200° to 500° C., typically 350° C. The same advantage can be obtained by implanting hydrogen ions at a dose of $1\times10^{13}$ to $1\times10^{15}$ $cm^{-2}$ and performing thermal processing at 200° to 300° C.

After the irradiation of the infrared light described above, a silicon oxide film 206 having a thickness of 1000 Å, was formed as a gate-insulating film by plasma CVD. TEOS (tetraethoxy-silane ($Si(OC_2H_5)_4$)) and oxygen were used as raw material gases in the plasma CVD. During the growth of the film, the substrate temperature was 300° to 550° C., e.g., 400° C.

After the formation of the silicon oxide film 206 becoming a gate-insulating film, an optical anneal using irradiation of visible light or near-infrared light was carried out under the same conditions as in the aforementioned step of irradiating infrared light. This anneal could annihilate mainly energy levels at and around the interface between the silicon oxide film 206 and the silicon film 205. This is quite useful for an insulated gate field-effect semiconductor device for which the characteristics of the interface between the gate-insulating film and the channel formation region are quite important.

Subsequently, an aluminum film having a thickness of 6000 to 8000 Å, e.g., 6000 Å, was formed by sputtering techniques. The aluminum contained 0.01 to 0.25% by weight of a rare-earth element belonging to group IIIa of the Periodic Table. Instead of aluminum, an element belonging to group IIIb can be used. The aluminum film was patterned to form gate electrodes 207 and 209. The surfaces of the aluminum electrodes were anodized to form oxide layers 208 and 210 on the surfaces. This anodic oxidation was effected within an ethylene glycol solution containing 1 to 5% tartaric acid. The thickness of the obtained oxide layers 208 and 210 was 2000 Å. These oxide layers 208 and 210 determine the thickness of an offset gate region in a later ion doping step and so the length of the offset gate region can be determined in the anodic oxidation step.

Then, using a gate electrode portion (comprising the gate electrode 207, the surrounding oxide layer 208, the gate electrode 209, and the surrounding oxide layer 210) as a mask, an impurity was implanted into the silicon film 205 to impart conductivity type P or N by self-aligning techniques and by ion doping (also known as plasma doping). Phosphine ($PH_3$) and diborane ($B_2H_6$) were used as dopant gases. Where the phosphine was used, the accelerating voltage was 60 to 90 kV, e.g., 80 kV. Where diborane was used, the accelerating voltage was 40 to 80 kV, e.g., 65 kV. The dose was $1\times10^{14}$ to $8\times10^{15}/cm^2$. For example, phosphorus was implanted at a dose of $2\times10^{15}/cm^2$. Boron was implanted at a dose of $5\times10^{15}/cm^2$. During the implantation, one region was coated with a photoresist to selectively implant the elements. As a result, N-type doped region 214, 216 and P-type doped regions 211, 213 were formed including respective channel regions 215 and 212. In this way, a region for a P-channel TFT (PTFT) and a region for an N-channel TFT (NTFT) could be formed.

Thereafter, the laminate was annealed by irradiation of laser light. The laser light was emitted by a KrF excimer laser having a wavelength of 248 nm and a pulse width of 20 nsec. Other lasers can also be used. The laser light was emitted at an energy density of 200 to 400 mJ/cm², e.g., 250 mJ/cm². Two to 10 shots of laser light were emitted per location. For example, two shots were emitted. During illumination of this laser light, if the substrate is heated to about 200° to 450° C., then the effect can be enhanced (FIG. 2(C)).

This step may utilize lamp annealing that makes use of visible light or near-infrared light. Visible and near-infrared radiation is easily absorbed by crystallized silicon and by amorphous silicon doped with phosphorus or boron at a dose of $10^{17}$ to $10^{21}$ cm$^{-3}$. This lamp anneal is comparable to thermal annealing carried out above 1000° C. If phosphorus or boron is added, the impurity scatters light. Therefore, even infrared light is sufficiently absorbed. This can be sufficiently estimated from the fact that the silicon is observed to be black with the naked eye. On the other hand, near-infrared light is not readily absorbed by the glass substrate and so the substrate is not overheated. Furthermore, the processing can be performed in a short time. Therefore, it can be said that this is the best method for a step where shrinkage of glass substrates is a problem.

Subsequently, a silicon oxide film 217 having a thickness of 6000 Å was formed as an interlayer insulator by plasma CVD. This interlayer insulator may also be made of either polyimide or a two-layer film consisting of silicon oxide and polyimide. Then, contact holes were formed. Electrodes and interconnects 218, 220, and 219 of TFTs were fabricated out of a metal material such as a multilayer film of titanium nitride and aluminum. Finally, the laminate was annealed at 350° C. for 30 minutes in a hydrogen ambient at 1 atm to complete semiconductor circuitry having complementary TFTs (FIG. 2(D)).

The circuitry described above is of the CMOS structure comprising complementary PTFT and NTFT. In the above step, it is also possible to fabricate the two TFTs simultaneously. Then, the substrate is cut at the center to obtain two independent TFTs at the same time.

Example 2

The present example is an active-matrix liquid crystal display comprising N-channel TFTs which are formed at pixels as switching devices. In the description made below, only one pixel is described but many other (generally hundreds of thousands of) pixels are formed similarly. Obviously, the TFTs are not limited to N-channel TFTs. P-channel TFTs can also be used.

Figure 2A:
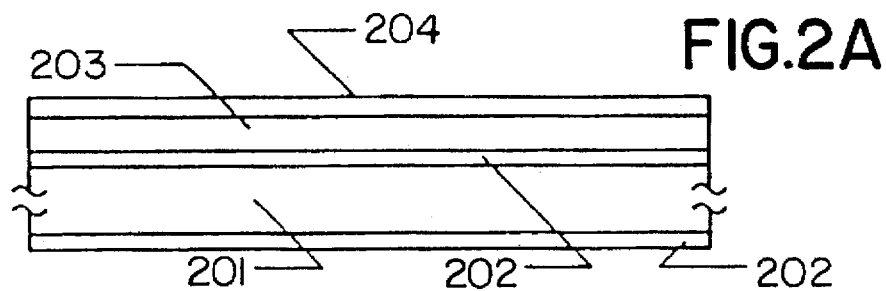
FIGS. 2(A)–2(D) are cross-sectional views of TFTs of Example 1 of the invention, illustrating successive steps for fabricating the TFTs.
Figure 2B:
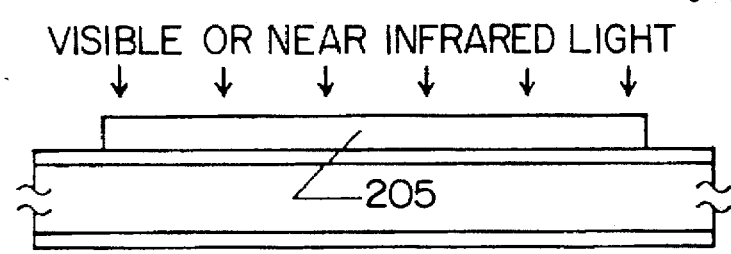
Figure 2C:
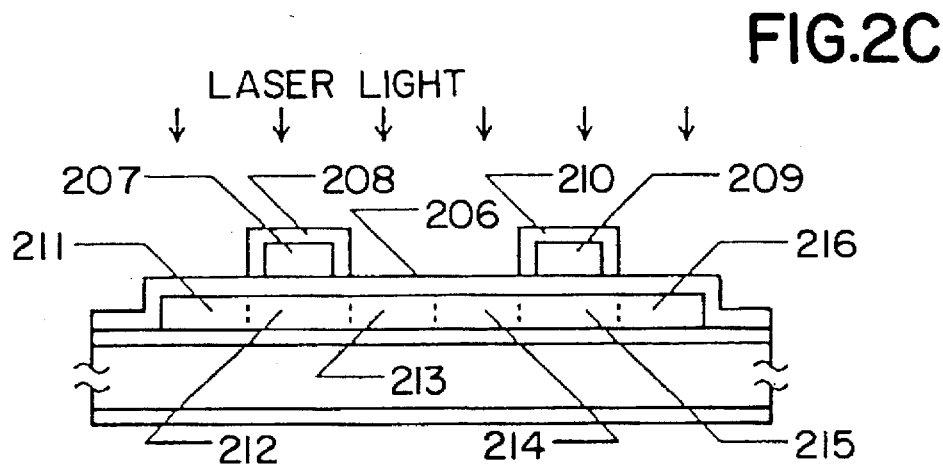
Figure 2D:
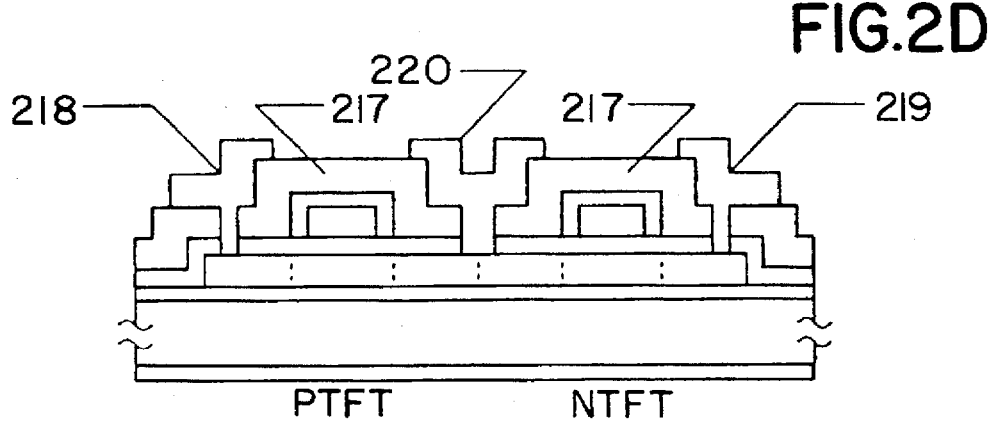
Figure 3A:
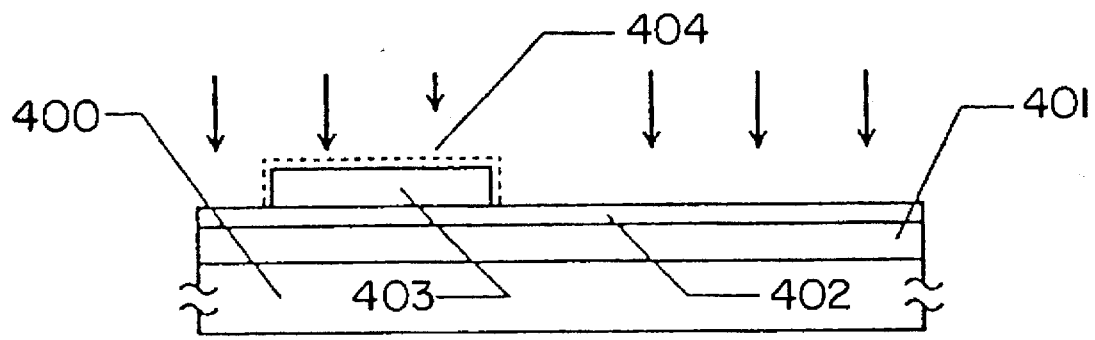
FIGS. 3(A)–3(C) are cross sections illustrating Example 2 of the invention, illustrating successive steps for fabricating the TFTs.
Figure 3B:
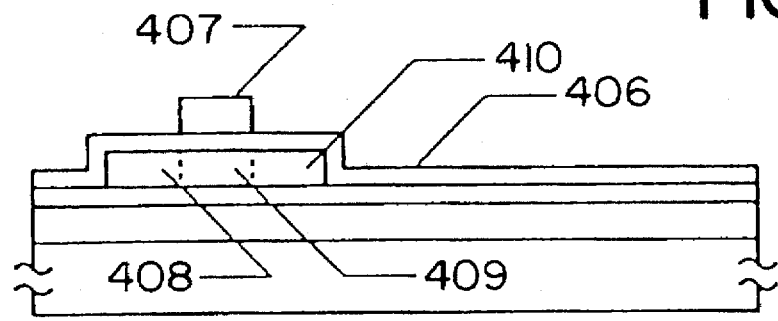
Figure 3C:
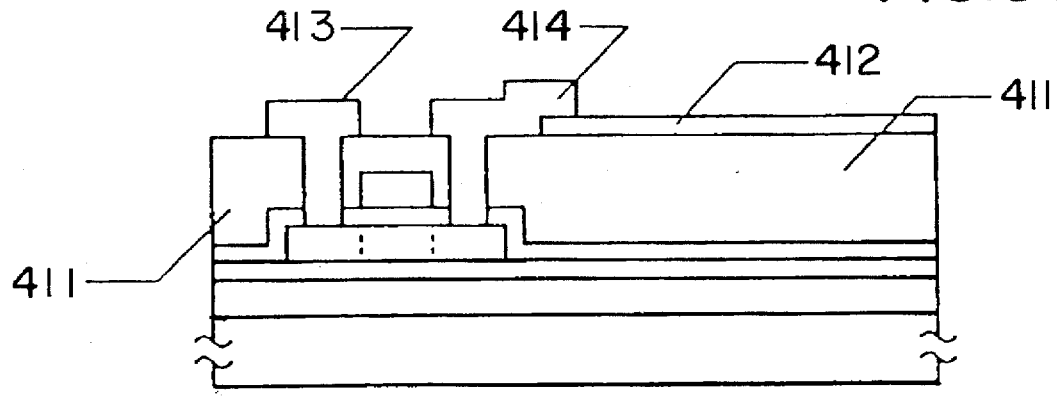
Figure 4A:
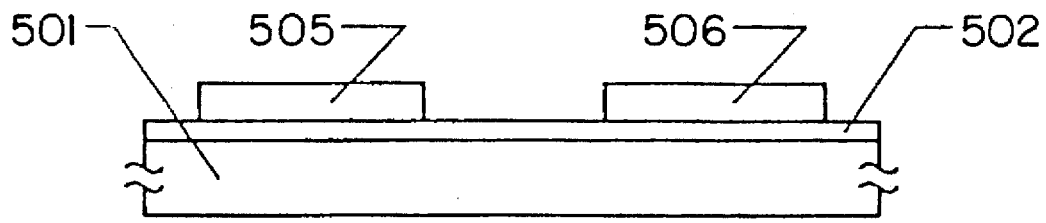
FIGS. 4(A)–4(D) are cross sections illustrating Example 3 of the invention, illustrating successive steps for fabricating the TFTs.
Figure 4B:
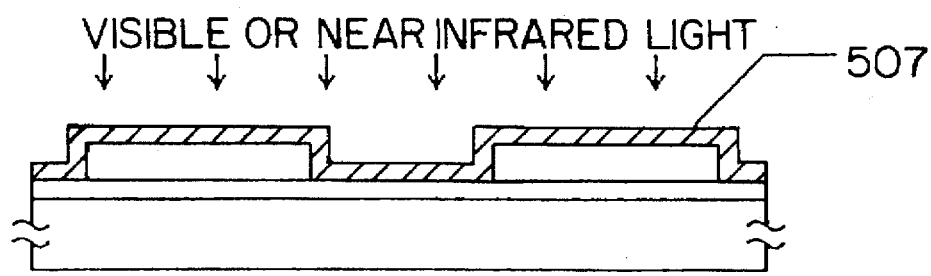
Figure 4C:
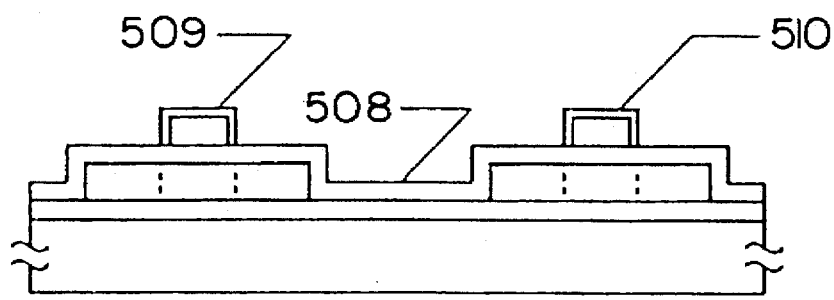
Figure 4D:
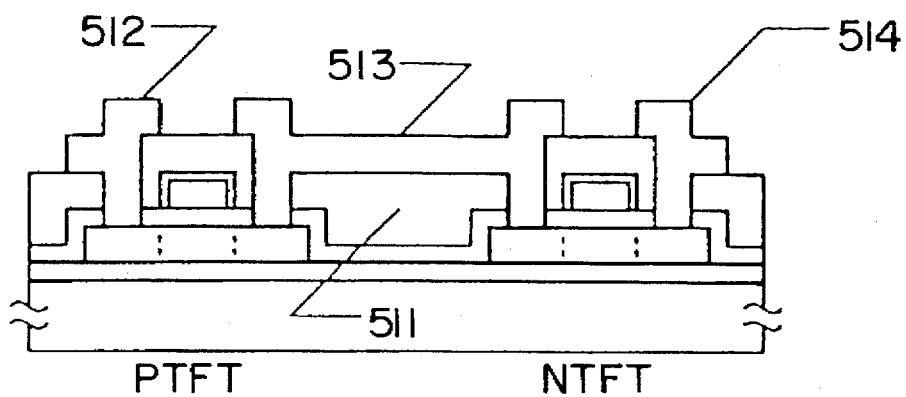

The process sequence of the present example is schematically shown in FIGS. 3(A)–3(C). In the present example, Corning 7059 glass was used as a substrate 400. This substrate had a thickness of 1.1 mm and measured 300 mm by 400 mm. First, an aluminum nitride film 401 was formed to a thickness of 1000 to 5000 Å, typically 2000 Å, by sputtering or reactive sputtering techniques. Since the aluminum nitride film has a high degree of transparency and suppresses movement of ions, the film effectively prevents mobile ions from diffusing from the substrate 400 into the TFT regions. A silicon oxide film 402 was formed as a bottom film to a thickness of 2000 Å, by plasma CVD.

Then, the laminate was heat-treated at 640° C. for 4 hours within a nitrogen ambient. Subsequently, the laminate was slowly cooled at a rate of 0.1° C./min within ammonia. This step produces desirable results if the rate is less than 0.5° C./min. In this step, the glass substrate having the bottom film thereon can be shrunk previously. Also during this step, the heating furnace shown in FIG. 1 was used.

Thereafter, an amorphous silicon film having a thickness of 1000 Å was formed by plasma CVD. A mask was then fabricated out of a photoresist. Silicon ions were implanted to a portion becoming a channel formation region. At this time, the projected range of implanted silicon ions were located in the vicinities of the center of the silicon film.

Subsequently, the mask was removed, and the laminate was thermally annealed at 550° C. for 8 hours. During this step, only the regions already doped with the silicon ions were crystallized. After this step, the laminate was rapidly cooled at a rate exceeding 50° C./min. This step may also utilize a method of consisting of taking the laminate out of the heating furnace and cooling the laminate by natural cooling.

Then, the silicon film was photolithographically patterned to leave behind the active layer 403 of a TFT in the form of an island. The central portion of this island 403 was already implanted with silicon ions and would become a channel formation region. In this structure, only the channel formation region had a high degree of crystallinity.

The active layer 403 in the form of an island was irradiated with visible light or near-infrared light in an ambient of oxygen or dinitrogen monoxide to improve the crystallinity of the silicon film. A silicon oxide film 404 having a thickness of 50 to 200 Å, typically 100 Å, was formed on the surface of the island. The temperature was 1100° C., and the time was 30 seconds. This step of forming the silicon oxide film 404 may also be carried out by heating the laminate to 550° to 650° C. in an ambient of oxygen or dinitrogen monoxide. Obviously, the apparatus shown in FIG. 1 was used for this purpose (FIG. 3(A)).

Then, a gate-insulating film 406 having a thickness of 500 to 3000 Å, typically 1200 Å, was formed out of aluminum nitride either by a sputtering method using a target of aluminum nitride or by a reactive sputtering method using a target of aluminum. The substrate temperature was 350° C. As a result, two layers were created. That is, one layer was the thin silicon oxide film 404 formed by thermal oxidation, while the other was the aluminum nitride film 406 formed by sputtering. Since the dielectric constant of aluminum nitride is more than five times as great as the dielectric constant of silicon oxide, the use of aluminum nitride is effective in reducing the threshold voltages of TFTs, especially the threshold voltage of P-channel TFTs. Furthermore, less localized centers are produced in aluminum nitride than in silicon nitride and so aluminum nitride is preferable as the material of a gate-insulating film. Thereafter, the aluminum nitride film 406 was annealed by thermal annealing within a nitrogen ambient or by lamp annealing.

Thereafter, a film consisting mainly of well-known polysilicon was formed by LPCVD and photolithographically patterned to form a gate electrode 407. In order to improve the conductivity, 0.1 to 5 atomic % of phosphorus was added as a dopant to the polysilicon (FIG. 3(B)).

Then, phosphorus was implanted as an N-type dopant by ion doping, and a source region 408, a channel formation region 409, and a drain region 410 were formed simultaneously by self-aligning techniques. The laminate was irradiated with light emitted by a KrF laser to improve the crystallinity of the silicon film which was deteriorated by the ion implantation. The energy density of the laser light was 250 to 300 mJ/cm$^2$. As a result of this laser irradiation, the sheet resistance of the source/drain regions of the TFTs assumed a value of 300 to 800 Ω/cm$^2$. In the case of a lightly doped drain structure (LDD) having a dose lower than normal source/drain regions, the sheet resistance was 10 to 200 kΩ/●. The laser annealing step may be replaced by lamp annealing making use of visible light or near-infrared light.

Thereafter, an interlayer insulator 411 was formed out of silicon oxide or polyimide. Then, a pixel electrode 412 was formed out of ITO. Contact holes were formed. Electrodes 413 and 414 were formed out of a multilayer film of chromium and aluminum in the source/drain regions of a TFT. One electrode 414 was connected also with the ITO pixel electrode 412. Finally, the laminate was annealed at 200°–400° C. for 2 hours within hydrogen to carry out hydrogenation. In this way, one TFT was completed (FIG. 3(C)).

Example 3

Figure 6:
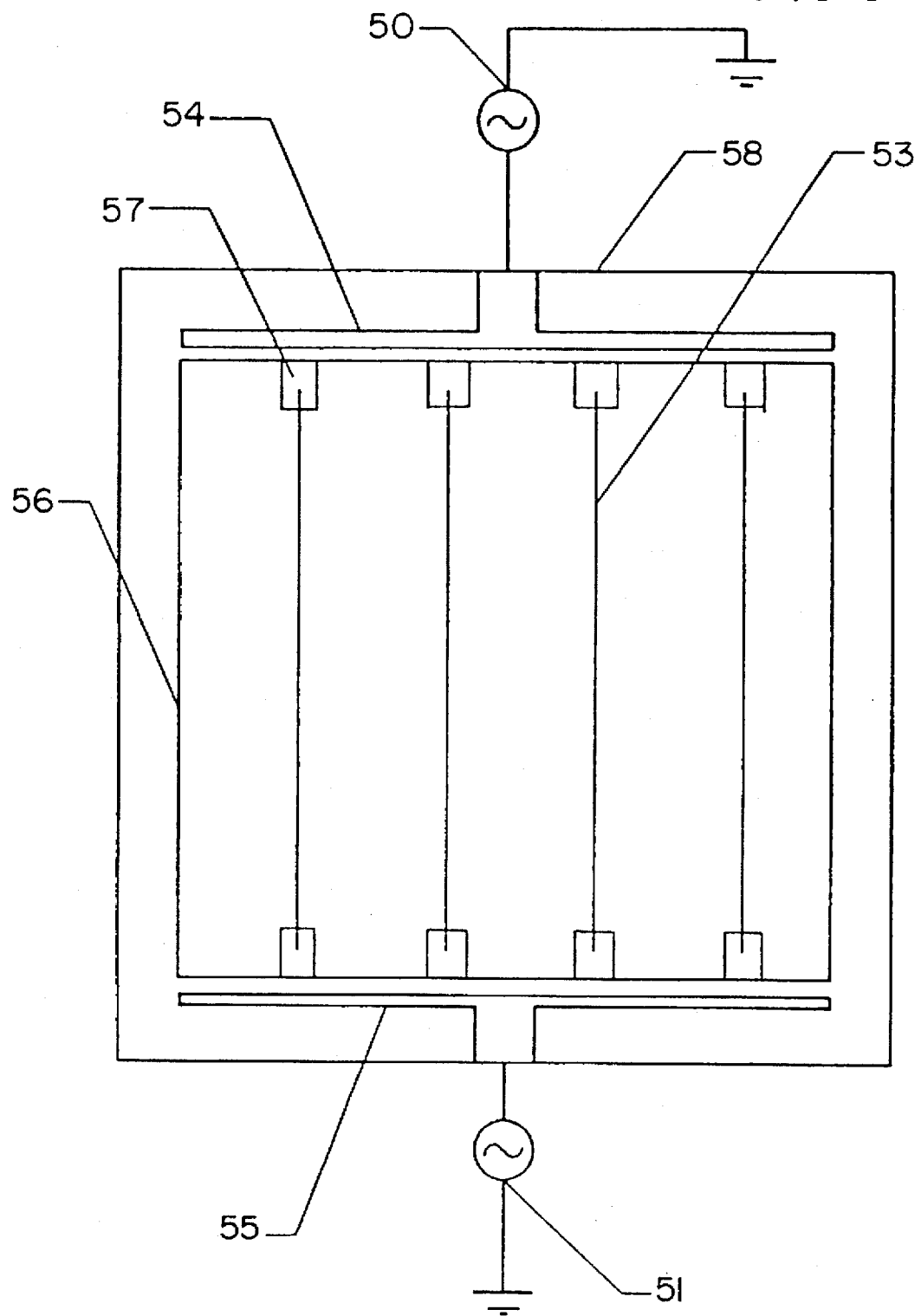
FIG. 6 is a schematic view of the CVD system shown in FIG. 5 taken on line A—A' of FIG. 5.

The present example is described by referring to FIGS. 4(A)–4(D). Corning 7059 glass was used as a substrate 501. An aluminum nitride film (not shown) having a thickness of 5000 Å was formed on each side of the substrate by the positive column type plasma-assisted CVD system shown in FIGS. 5 and 6. To anneal the aluminum nitride film and to prevent shrinkage, the glass substrate was previously annealed at 640° C. for 4 hours within nitrogen. Then, the substrate was slowly cooled down to 450° C. at a rate of 0.1° C./min within nitrogen. Thereafter, the substrate was taken out of the heating furnace.

As a result of this step, the glass substrate shrank to a large extent. Shrinkage caused by a later heating step could be suppressed within 50 ppm. At the same time, the aluminum nitride (AlN) film could be annealed. Its insulation and transmissivity could be improved.

First, a bottom film 502 was formed on the substrate 501. An amorphous silicon film having a thickness of 300 to 800 Å was formed by plasma CVD. The laminate was thermally annealed at 600° C. for 1 hour. Thereafter, the laminate was rapidly cooled down to 450° C. at a rate of ° 2 to 200° C./sec, preferably at a rate in excess of 10° C./sec to prevent the substrate from shrinking. If the used heating furnace does not permit this rapid cooling, then the same advantage can be obtained by taking the substrate out of the furnace and maintaining the substrate at room temperature. Also during this step, the heating furnace shown in FIG. 1 was used.

In the present example, since the thermal annealing temperature was higher than the strain point (593° C.) of the Corning 7059 glass, it was difficult to suppress shrinkage even if previous heat treatment and slow cooling were carried out. In this case, rapid cooling from the annealing temperature described above produces desirable effects.

Then, the silicon film was photolithographically patterned to form active layer regions 505 and 506 in the form of islands. The active layer regions were etched by RIE having vertical anisotropy (FIG. 4(A)).

Thereafter, a silicon oxide film or silicon nitride film 507 having a thickness of 200 to 3000 Å was formed by plasma CVD. Where the silicon oxide film was formed, LPCVD or photo-assisted CVD may also be used. Then, the laminate was treated with visible light or near-infrared light under the same conditions as in Example 1. In the present example, during irradiation of visible light or near-infrared light, a protective film of silicon oxide or silicon nitride was formed on the surfaces of the active layers. This could prevent the surface from roughening or becoming contaminated during irradiation of infrared light (FIG. 4(B)).

After the irradiation of the visible light or near-infrared light, the protective film 507 was removed. Thereafter, a gate-insulating film 508, a gate electrode, a surrounding oxide layer 509, another gate electrode, and a surrounding oxide layer 510 were formed, in the same way as in Example 1. Doped regions were formed by ion doping and activated by laser irradiation (FIG. 4(C)).

Thereafter, an interlayer insulator 511 was formed, and contact holes were formed in the insulator. Metallic interconnects 512, 513, and 514 were formed (FIG. 4(D)).

In this way, a complementary TFT circuit was completed. In the present example, during irradiation of visible light or near-infrared light, a protective film was formed on the surfaces of the active layers. This could prevent the surfaces from roughening or becoming contaminated during irradiation. Therefore, TFTs of the present example had quite excellent characteristics, such as excellent field mobility and threshold voltage, and quite high reliability. Furthermore, as can be seen from the present example, the present invention can be applied with especially great utility to glass substrate materials having strain points of 550° to 650° C. In the present invention, if the slow cooling step is carried out within an ambient of a nitrogenous gas such as nitrogen, ammonia, or dinitrogen monoxide, then the glass is nitrided. This suppresses diffusion and deposition of various impurity elements contained in the glass onto the glass surface. Hence, semiconductor devices having high reliability can be manufactured.

In accordance with the present invention, a glass substrate is previously heat-treated above the transition point. Then, the substrate is slowly cooled to cause it to shrink. Subsequently, the substrate is heat-treated below the strain point of the substrate. The substrate is then rapidly cooled. Thus, shrinkage of the glass substrate occurring at this time can be reduced to a minimum.

An aluminum nitride (AlN) film is formed as a bottom film for a semiconductor film. As a result, TFTs can have margins for heat generated. This can enhance the reliability and stability of a device using TFTs such as an active-matrix liquid crystal display.

Furthermore, by carrying out the step for preheating the glass substrate in an ambient consisting of a mixture of nitrogen and oxygen, the processing for previously shrinking the glass substrate can be effected simultaneously with the thermal annealing step for enhancing the insulation and transmissivity of the aluminum nitride film. This is quite useful to the manufacturing process.

In the illustrated examples, the description centers on Corning 7059 glass substrate. Obviously, other glass substrates such as Corning 1733, HOYA LE30, HOYA NA35, HOYA NA45, OA2 manufactured by Nippon Electric Glass (NEG) Co., Ltd., Asahi Glass AN1, and Asahi Glass AN2 which are listed in Table 1 can produce similar effects.

What is claimed is:

1. A method for heat-treating a glass substrate having a strain point comprising the steps of:

forming a film comprising aluminum nitride on a surface of said glass substrate; and heat-treating said glass substrate at a temperature lying within 50° C. from the strain point of said glass substrate, wherein said film contains oxygen at 0.001 to 10 atomic %.

2. A method of heat-treating a glass substrate having a strain point comprising the steps of:

forming a film comprising aluminum nitride on a surface of said glass substrate; and heat-treating said glass substrate at a temperature lying within 50° C. from the strain point of said glass substrate in an ambient atmosphere of nitrogen or a mixture of nitrogen and oxygen, wherein said aluminum nitride contains 0.01 to 20 atomic % of oxygen.

3. The method of claim 2 further comprising the step of, after said step of heat-treating said glass substrate, cooling said glass substrate at a rate of 0.01° to 0.5° C./min.

4. The method of claim 2 wherein after said step of heat-treating said glass substrate, a second heat treatment step is carried out at a temperature lower than the temperature of said step of heat-treating said glass substrate, and wherein after the second heat treatment step, the substrate is rapidly cooled at a rate of 10° C./min to 300° C./sec.

5. A method of heat-treating a glass substrate comprising the steps of:

forming a film comprising aluminum nitride on a surface of said glass substrate; and heat-treating said glass substrate in an ambient atmosphere selected from the group consisting of $N_2$, $N_2O$, $NH_3$ and mixtures thereof and simultaneously annealing said film comprising aluminum nitride, wherein said film contains oxygen at 0.001 to 10 atomic %.

6. The method of claim 5 further comprising a step of cooling said glass substrate in an ambient atmosphere containing $N_2$, $N_2O$, or $NH_3$ after said heat-treating step.

7. A method of heat-treating a glass substrate comprising the steps of:

forming a film comprising aluminum nitride on a surface of said glass substrate;

first heat-treating said glass substrate in an ambient atmosphere selected from the group consisting of $N_2$, $N_2O$, $NH_3$ and mixtures thereof;

slowly cooling said glass substrate after said first heat-treating step;

second heat-treating said glass substrate at a temperature lower than a temperature used in said first heat-treating step; and rapidly cooling said glass substrate after said second heat-treating step.

8. The method of claim 7 wherein said slowly cooling step is carried out at a rate of 0.01° to 0.5° C./min.

9. The method of claim 7 wherein said rapidly cooling step is carried out at a rate of 10° C./min to 300° C./sec.

10. A method of heat-treating a glass substrate comprising the steps of:

forming a film comprising aluminum nitride on top and bottom surfaces of said glass substrate; and heat-treating said glass substrate having said film formed thereon in an ambient atmosphere containing nitrogen, wherein said aluminum nitride contains 0.01 to 20 atomic % of oxygen.

11. The method of claim 10 wherein said step of forming said film comprising aluminum nitride is carried out by a method selected from the group consisting of positive column plasma CVD, plasma CVD and thermal CVD.

12. The method of claim 10 wherein said substrate is heated to a temperature higher than a strain point of said glass substrate by said heat-treating step.

13. The method of claim 10 wherein said glass substrate is maintained substantially horizontally in said heat-treating step.

14. A method of heat-treating a glass substrate on which a semiconductor device is to be formed, said method comprising the steps of:

forming a film comprising aluminum nitride at least on a surface of said glass substrate on which said semiconductor device is to be formed;

heat-treating said glass substrate;

slowly cooling said glass substrate at a rate of 0.01° to 0.5° C./min in an ambient atmosphere containing nitrogen; and then forming said semiconductor device on said glass substrate, wherein the step of heat-treating is carried out at a temperature higher than any process temperature at which said semiconductor device is formed on said glass substrate.

15. The method of claim 14 wherein said semiconductor device comprises a transistor.

16. A method of heat-treating a glass substrate having a strain point comprising the steps of:

heat-treating said glass substrate above said strain point;

slowly cooling said glass substrate after said heat-treating step;

forming a film comprising aluminum nitride at least on one surface of said glass substrate; and heat-treating said glass substrate and said film in an ambient atmosphere containing nitrogen to anneal said film comprising aluminum nitride.

17. A method of heat-treating a glass substrate having a strain point comprising the steps of:

first heat-treating said glass substrate at a temperature higher than said strain point;

first cooling said glass substrate after said first heat-treating step at a rate of 0.01° C./min. to 0.5° C./min.;

second heat-treating said glass substrate after said first cooling step at a temperature lower than said strain point; and second cooling said glass substrate after said second heat-treating step at a rate of 10° C./min. to 300° C./sec., wherein said method comprises a further step of forming a film on said glass substrate either before or after performing the step of said first heat-treating and before performing the step of said second heat-treating.

18. The method of claim 17 wherein said first heat-treating step is carried out in an ambient atmosphere containing $N_2$.

19. A method of heat-treating a glass substrate having a strain point comprising the steps of:

first heat-treating said glass substrate at a temperature higher than said strain point;

first cooling said glass substrate after said first heat-treating step at a rate of 0.01° C./min to 0.5° C./min.;

second heat-treating said glass substrate after said first cooling step at a temperature higher than said strain point; and second cooling said glass substrate after said second heat-treating step at a rate of 10° C./min. to 300° C./sec, wherein said first heat-treating step is carried out at a temperature higher than said second heat-treating step, and wherein said method comprises a further step of forming a film on said glass substrate either before or after performing the step of said first heat-treating and before performing the step of said second heat-treating.

20. The method of claim 19 wherein said first heat-treating step is carried out in an ambient atmosphere containing $N_2$.

21. A method of heat-treating a glass substrate having a strain point comprising the steps of:

first heat-treating said glass substrate at a temperature higher than said strain point;

first cooling said glass substrate after said first heat-treating step at a rate of 0.01° C./min. to 0.5° C./min.;

second heat-treating said glass substrate after said first cooling step at a temperature higher than said strain point and lower than said temperature at which said first heat-treating is conducted; and second cooling said glass substrate after said second heat-treating step at a rate of 2° to 200° C./sec.

wherein said method comprises a further step of forming a film on said glass substrate either before or after performing the step of said first heat-treating and before performing the step of said second heat-treating.

22. The method of claim 21 wherein said first heat-treating step is carried out in an ambient atmosphere containing $N_2$.

23. A method of heat-treating a glass substrate having a strain point comprising the steps of:

heat-treating said glass substrate at a temperature higher than said strain point;

first cooling said glass substrate after said heat-treating step at a rate of 0.01° C./min. to 0.5° C./min.;

forming an insulating film on said glass substrate;

forming a silicon film on said insulating film after said first cooling step;

crystallizing said silicon film formed on said insulating film; and second cooling said silicon film formed on said insulating film after said crystallizing step at a rate of 10° C./min. to 300° C./sec., wherein said crystallizing step is carried out at a temperature lower than said heat-treating step.

24. The method of claim 23 wherein said first heat-treating step is carried out in an ambient atmosphere containing $N_2$.

25. The method of claim 23 wherein said insulating film comprises silicon oxide.

* * * * *